(12) United States Patent
Meng et al.

(10) Patent No.: US 10,321,125 B2
(45) Date of Patent: Jun. 11, 2019

(54) CONTROL METHOD AND A CONTROL APPARATUS FOR A NAKED EYE 3D DISPLAY APPARATUS AND A NAKED EYE 3D DISPLAY APPARATUS

(71) Applicants: BOE TECHNOLOGY GROUP CO., LTD., Beijing (CN); Beijing Boe Display Technology Co., Ltd., Beijing (CN)

(72) Inventors: Zhiming Meng, Beijing (CN); Weihao Hu, Beijing (CN); Daekeun Yoon, Beijing (CN); Jianming Wang, Beijing (CN); Zongze He, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 466 days.

(21) Appl. No.: 14/803,606

(22) Filed: Jul. 20, 2015

(65) Prior Publication Data
US 2016/0205389 A1    Jul. 14, 2016

(30) Foreign Application Priority Data
Jan. 13, 2015 (CN) .......................... 2015 1 0017517

(51) Int. Cl.
*H04N 13/04* (2006.01)
*H04N 13/383* (2018.01)
*H04N 13/378* (2018.01)

(52) U.S. Cl.
CPC ......... *H04N 13/383* (2018.05); *H04N 13/047* (2013.01); *H04N 13/0409* (2013.01); *H04N 13/0415* (2013.01); *H04N 13/378* (2018.05)

(58) Field of Classification Search
CPC .......... H04N 13/0484; H04N 13/0479; H04N 13/047; H04N 13/0415; H04N 13/0409
(Continued)

(56) References Cited

U.S. PATENT DOCUMENTS 7,839,430 B2 * 11/2010 Hentschke ........... G02B 27/225
                                                                  348/59
9,160,993 B1 * 10/2015 Lish .................... H04N 5/23229
(Continued)

FOREIGN PATENT DOCUMENTS

| CN | 101995668 | 3/2011 |
| CN | 102099728 | 6/2011 |

(Continued)

OTHER PUBLICATIONS

Office Action from China Application No. 201510017517.6 dated Feb. 4, 2017.
(Continued)

*Primary Examiner* — Janese Duley
(74) *Attorney, Agent, or Firm* — Calfee, Halter & Griswold LLP

(57) ABSTRACT

A control method and a control apparatus for a naked eye 3D display apparatus and a naked eye 3D display apparatus are described. The control method for a naked eye 3D display apparatus includes: detecting the position of a user; determining viewpoints where the left eye and right eye of the user are located according to the detected position of the user; and turning on sub-pixels corresponding to the determined viewpoints and turning off other sub-pixels. Such a control method enables a user is caused to only see those display pictures corresponding to viewpoints that need to be seen, thereby solving the problem of cross-talk between multiple viewpoints.

5 Claims, 3 Drawing Sheets

(58) Field of Classification Search
USPC .......................................................... 348/78
See application file for complete search history.

(56) References Cited

U.S. PATENT DOCUMENTS

| | | | | |
|---|---|---|---|---|
| 2005/0276448 | A1* | 12/2005 | Pryor | B60K 35/00 |
| | | | | 382/103 |
| 2007/0019291 | A1* | 1/2007 | Nam | H04N 13/0422 |
| | | | | 359/464 |
| 2011/0102553 | A1* | 5/2011 | Corcoran | G06K 9/00281 |
| | | | | 348/50 |
| 2011/0216249 | A1* | 9/2011 | Tsubata | G02F 1/136213 |
| | | | | 348/731 |
| 2012/0038632 | A1* | 2/2012 | Matsunaga | G02B 27/2214 |
| | | | | 345/419 |
| 2012/0075496 | A1* | 3/2012 | Akifusa | H04N 1/00183 |
| | | | | 348/222.1 |

FOREIGN PATENT DOCUMENTS

| | | |
|---|---|---|
| CN | 102710956 | 10/2012 |
| CN | 103293692 | 9/2013 |

OTHER PUBLICATIONS

Second Office Action from China Application No. 201510017517.6 dated Aug. 15, 2017.

\* cited by examiner

CONTROL METHOD AND A CONTROL APPARATUS FOR A NAKED EYE 3D DISPLAY APPARATUS AND A NAKED EYE 3D DISPLAY APPARATUS

FIELD OF THE INVENTION

The disclosure relates to the field of display technologies, and in particular, to a control method and a control apparatus for a naked eye 3D display apparatus and a naked eye 3D display apparatus.

BACKGROUND OF THE INVENTION

A naked eye 3D display apparatus is a display apparatus on which a 3D display picture may be viewed without the need for wearing an auxiliary tool. The display principle of the naked eye 3D display apparatus is that a lens cylinder or parallax grating is placed in front of a display panel of the display apparatus, such that the display picture viewed by the left eye is different from that viewed by the right eye, and that the display pictures produce a 3D visual effect.

FIG. 1 is a schematic diagram of the display principle of a naked eye 3D display apparatus in the prior art. Generally, multiple viewpoints may be disposed, such that a user may see a 3D display picture at multiple positions. As shown in FIG. 1, five viewpoints, viewpoint 1, viewpoint 2, viewpoint 3, viewpoint 4 and viewpoint 5, may be disposed. At this point, a grating 7 located in front of a display panel 6 may cause both eyes of a user located at a certain position to see display pictures corresponding to two neighboring viewpoints of the five viewpoints. For example, the left eye of the user may see a display picture corresponding to the viewpoint 3, and the right eye of the user may see a display picture corresponding to the viewpoint 2, such that the user can see a 3D display picture.

However, the inventors have found that in the above described display principle of the naked eye 3D display apparatus in the prior art, when the user views display pictures corresponding to the viewpoint 2 and the viewpoint 3, he will also see display pictures corresponding to the viewpoint 1, the viewpoint 4 and the viewpoint 5 neighboring to the above viewpoints, thereby producing a cross-talk phenomenon and affecting the display effect.

SUMMARY OF THE INVENTION

In order to overcome the drawbacks and problems existing in the above described naked eye 3D display apparatus in the prior art, the disclosure provides a control method and a control apparatus for a naked eye 3D display apparatus and a naked eye 3D display apparatus which solve the problem of cross-talk between multiple viewpoints.

According to an aspect of the disclosure, there is proposed a control method for a naked eye 3D display apparatus comprising the following steps of: detecting the position of a user; determining viewpoints where the left eye and right eye of the user are located according to the detected position of the user; and turning on sub-pixels corresponding to the determined viewpoints and turning off other sub-pixels. Thus, by such a control method for a naked eye 3D display apparatus of the disclosure, a user is caused to only see those display pictures corresponding to viewpoints that need to be seen, thereby solving the problem of cross-talk between multiple viewpoints existing in the prior art.

In an embodiment of the control method for a naked eye 3D display apparatus according to the disclosure, the step of detecting the position of a user may comprise detecting the position coordinate of the user by a human face recognition technique.

In an embodiment of the control method for a naked eye 3D display apparatus according to the disclosure, before the step of detecting the position of a user, the method may further comprise creating a database, wherein the database may comprise a corresponding relationship between the positions of the user and viewpoints where the left eye and the right eye of the user are located.

In an embodiment of the control method for a naked eye 3D display apparatus according to the disclosure, the step of creating a database comprises: detecting multiple position coordinates; determining a viewpoint corresponding to each position coordinate according to a display picture seen at each position coordinate; and creating a database according to the position coordinates and the viewpoints corresponding to the position coordinates.

In an embodiment of the control method for a naked eye 3D display apparatus according to the disclosure, the step of determining viewpoints where the left eye and right eye of the user are located according to the detected position of the user may comprise: determining viewpoints where the left eye and right eye of the user are located by querying the database according to the detected position of the user.

According to another aspect of the disclosure, there is provided a control apparatus for a naked eye 3D display apparatus, which control apparatus comprises: a position detection unit for detecting the position of a user; a viewpoint determination unit for determining viewpoints where the left eye and right eye of the user are located according to the position of the user detected by the position detection unit; and a pixel control unit for turning on sub-pixels corresponding to the determined viewpoints and turning off other sub-pixels.

In an embodiment of the control apparatus for a naked eye 3D display apparatus according to the disclosure, the position detection unit may comprise a human face recognition module.

In an embodiment of the control apparatus for a naked eye 3D display apparatus according to the disclosure, the control apparatus may further comprise: a database creation unit for creating a database, wherein the database may comprise a corresponding relationship between the positions of the user and viewpoints where the left eye and the right eye of the user are located.

According to yet another aspect of the disclosure, there is provided a naked eye 3D display apparatus comprising the above described control apparatus for a naked eye 3D display apparatus according to the disclosure.

In an embodiment of the naked eye 3D display apparatus according to the disclosure, the naked eye 3D display apparatus may further comprise a display panel and a grating, wherein the display panel comprises red sub-pixels, green sub-pixels and blue sub-pixels, while the grating comprises light transmission stripes, the extension direction of the light transmission stripes is parallel to the arrangement direction of sub-pixels corresponding to a single viewpoint, and along the extension direction of the light transmission stripes, the sub-pixels corresponding to a single viewpoint comprise red sub-pixels, green sub-pixels and blue sub-pixels.

BRIEF DESCRIPTION OF THE DRAWINGS

In order to more clearly illustrate the technical solutions in embodiments of the disclosure or in the prior art, the appended drawings will be references in the description of the embodiments. It should be noted that the drawings in the following description are only some embodiments of the disclosure, and for those of ordinary skills in the art, other drawings may also be obtained according to these drawings under the premise of not paying out creative work.

DETAILED DESCRIPTION OF THE INVENTION

In the following, the technical solutions of the disclosure will be clearly and fully described in connection with the drawings. Obviously, the described embodiments are only part of embodiments of the disclosure, but not all the embodiments. Based on the embodiments in the disclosure, all other embodiments obtained by those of ordinary skills in the art without paying creative work pertain to the scope of protection of the disclosure.

Figure 1:
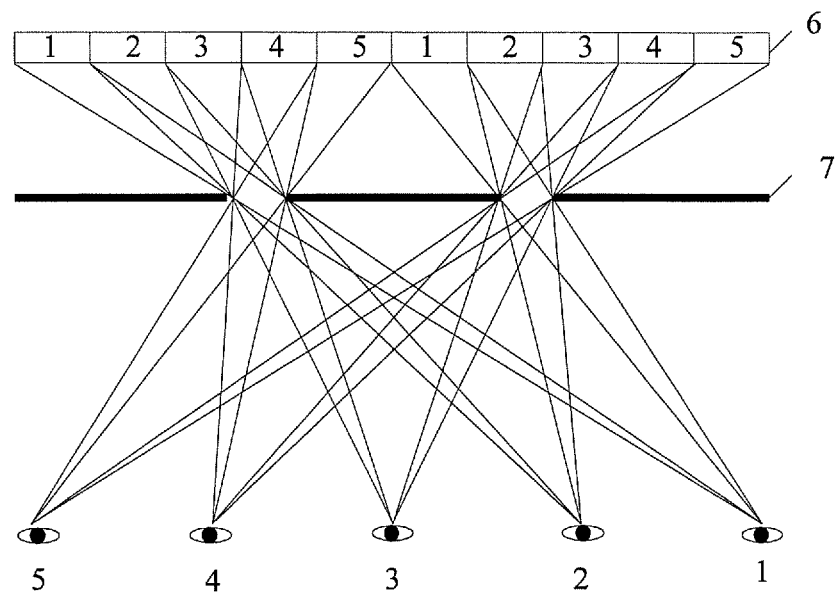
FIG. 1 is a schematic diagram of the display principle of a naked eye 3D display apparatus in the prior art.
Figure 2:
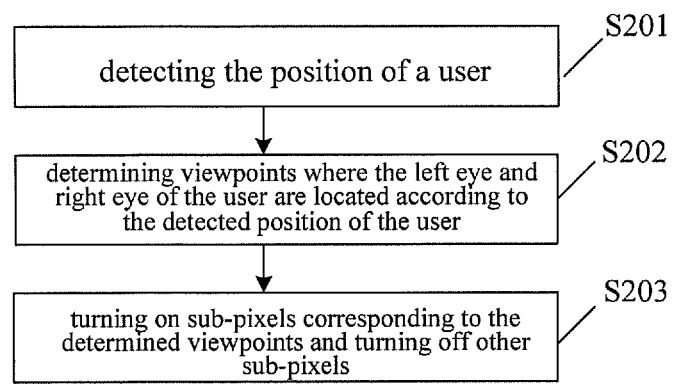
FIG. 2 is a flow chart of a control method for a naked eye 3D display apparatus according to an embodiment of the disclosure.

FIG. 2 is a flow chart of a control method for a naked eye 3D display apparatus according to an embodiment of the disclosure. The control method is adapted for controlling the process of displaying a picture by the naked eye 3D display apparatus. Therein, the naked eye 3D display apparatus generally comprises a display panel, and further comprises a component such as a lens cylinder or grating, etc. which may cause a display picture of the display panel to present a 3D effect. In the following, taking that the naked eye 3D display apparatus comprises a display panel and a grating as an example, the control method for a naked eye 3D display apparatus will be described.

As shown in FIG. 2, in some embodiments, the control method for a naked eye 3D display apparatus comprises the following steps: step S201, detecting the position of a user; step S202, determining viewpoints where the left eye and right eye of the user are located according to the detected position of the user; and step S203, turning on sub-pixels corresponding to the viewpoints and turning off other sub-pixels. In this control method, by turning on sub-pixels corresponding to the viewpoints that the user needs to view and turning off other sub-pixels, the user may only see those display pictures corresponding to viewpoints that need to be seen, thereby solving the problem of cross-talk between multiple viewpoints.

In the following, the steps S201-S203 will be described in detail respectively.

Figure 3:
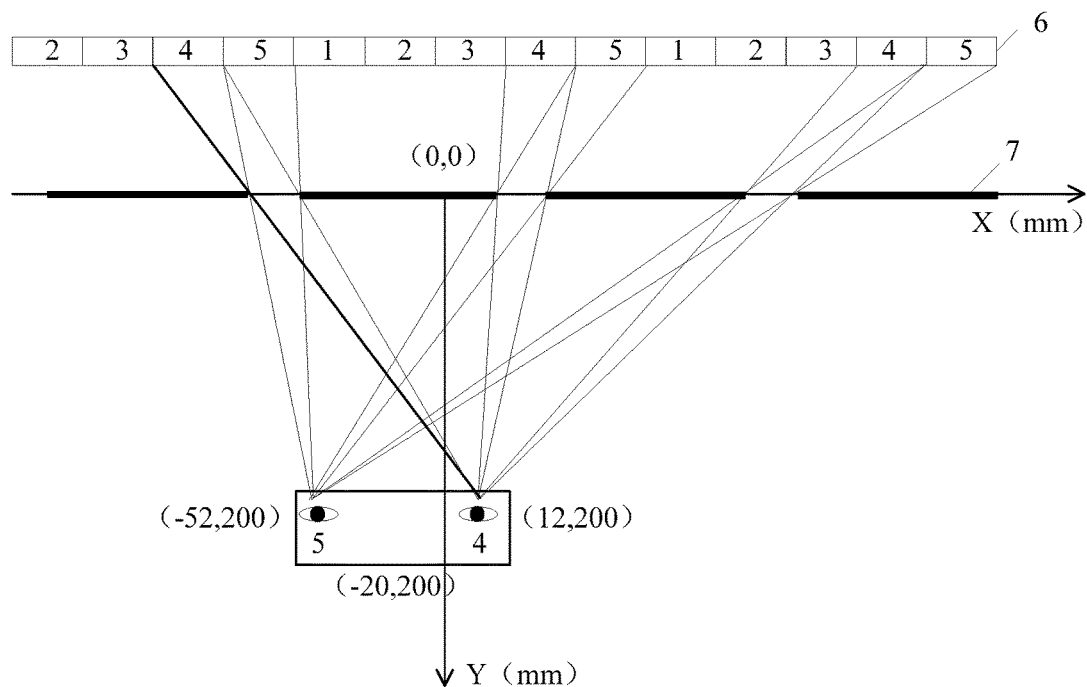
FIG. 3 is a schematic diagram of a positional relationship between a user and a naked eye 3D display apparatus in the control method for a naked eye 3D display apparatus according to an embodiment of the disclosure.

In step S201 of the control method as shown in FIG. 2, to detect the position of a user, for example, the position of a human face may be detected by a human face recognition technique. In particular, according to a coordinate system established in advance, the position coordinate of the human face is determined utilizing a human facial recognition device, and this is taken as the position coordinate of the user. As such, the position of the user can be detected more accurately. FIG. 3 shows a schematic diagram of a corresponding relationship between the positions of a user and viewpoints where his left and right eyes are located in the control method for a naked eye 3D display apparatus according to an embodiment of the disclosure. In the following, step S201 will be described in detail in connection with FIG. 3. As shown in FIG. 3, first, a human face recognition device (not shown) may be disposed at a central position on an upper edge of a grating 7 in front of a display panel 6. Second, a coordinate system is constructed; that is, the central position is defined as the origin of coordinates (0, 0). A direction which passes the origin of coordinates and is parallel to the upper and lower edges of the display panel 6 is the X-axis direction, and a direction which passes the origin of coordinates and is perpendicular to the display panel 6 (i.e. perpendicular to the X-axis) is the Y-axis direction, thereby establishing a planar rectangular coordinate system. Last, the position coordinate of a human face within a visual area of the display panel 6 is detected by the human face recognition device, for example, as shown in FIG. 3, the detected position coordinate of the human face is (−20 mm, 200 mm).

In step S201 of detecting the position of a user as shown in FIG. 2, the human face recognition device may be any camera with the function of human face recognition, like an infrared camera. The position of the human face recognition device is not limited to being disposed at the central position on the upper edge of the grating 7 in front of the display panel 6, but may also be disposed at other place, provided that it is possible to be able to detect or recognize a human face and determine the position coordinate of the human face. Of course, in addition to utilization of a human face recognition technique, a person skilled in the art may also detect the position of the user by other techniques. For example, the position coordinate of the user may be derived by utilizing an infrared ranging technique. Furthermore, for the coordinate system established in step S201, in addition to the above mentioned planar rectangular coordinate system, any other coordinate system capable of accurately positioning the user may also be employed, for example, a polar coordinate system or a non-rectangular plane affine coordinate system, etc.

In step S202 of the control method as shown in FIG. 2, viewpoints where the left eye and right eye of the user are located may be determined. For example, a database may be queried according to the detected position of the user, wherein the database contains a corresponding relationship between the positions of a user and viewpoints where the left eye and right eye of the user are located.

In step S203 of the control method as shown in FIG. 2, since a display image of the naked eye 3D display apparatus is a point-to-point image, namely, viewpoints correspond to sub-pixels, after viewpoints where the left eye and right eye of the user are located are determined, it is possible to turn on sub-pixels corresponding to the determined viewpoints where the left eye and the right eye of the user are located and turn off other sub-pixels by a pixel control unit (e.g., a timing controller, etc.).

Further, in step S202 of determining viewpoints where the left eye and right eye of the user are located, a database comprising a corresponding relationship between the positions of a user and viewpoints where the left eye and right eye of the user are located is used, and the viewpoints where the left eye and right eye of the user are located can be determined conveniently and rapidly by querying the database. Hence, in the control method for a naked eye 3D display apparatus according to an embodiment of the disclosure, before step S202, there may further be comprised a step of creating the above database.

Figure 4:
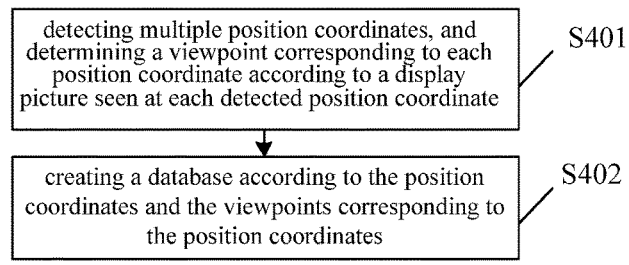
FIG. 4 is a flow chart of the step of creating a database in the control method for a naked eye 3D display apparatus according to an embodiment of the disclosure.

FIG. 4 shows a flow chart of a step of creating a database in the control method for a naked eye 3D display apparatus according to an embodiment of the disclosure. As shown in FIG. 4, the step of creating a database comprising a corresponding relationship between the positions of a user and viewpoints where the left eye and right eye of the user are located may comprise: step S401, detecting multiple position coordinates, and determining a viewpoint corresponding to each position coordinate according to a display picture seen at each detected position coordinate; and step S402, creating a database according to the position coordinates and the viewpoints corresponding to the position coordinates.

Step S401, as shown in FIG. 4, may be embodied in the following way. First, different viewpoints are disposed to correspond to different display pictures so as to facilitate determination of a viewpoint corresponding to a position coordinate, for example, display pictures corresponding to viewpoint 1, viewpoint 2, viewpoint 3, viewpoint 4 and viewpoint 5 are respectively disposed to be digit 1, digit 2, digit 3, digit 4 and digit 5. Second, a coordinate system is created. Here, the way of creating a coordinate system in step S201 may be employed to create a coordinate system as shown in FIG. 3. Then, display pictures viewed at multiple position coordinates are detected, and a viewpoint corresponding to a position coordinate is determined according to the corresponding relationship between viewpoints and display pictures. For example, as shown in FIG. 3, a display picture detection device (not shown), such as a monocular camera, is placed at a certain position in a visual area of the display panel 6. The position coordinate of the display picture detection device is determined, and thereby the viewpoint corresponding to the position coordinate is determined according to the display picture detected by the display picture detection device in combination with the corresponding relationship between viewpoints and display pictures. In this way, the corresponding relationship between multiple position coordinates within the visual area of the display panel 6 and viewpoints may be determined until the corresponding relationship between position coordinates completely covers the visual area of the display panel 6 and viewpoints are obtained, such that the maximum distance between any two neighboring position coordinates within the visual area of the display panel 6 is not more than the width of eye, thereby achieving complete coverage of the visual area. As an example, when the position coordinate of the display picture detection device such as a monocular camera is (−52 mm, 200 mm), the display picture detected by the display picture detection device is digit 5, and therefore it may be determined that the position coordinate (−52 mm, 200 mm) corresponds to viewpoint 5; and when the position coordinate of the display picture detection device is (12 mm, 200 mm), the display picture detected by the display picture detection device is digit 4, and therefore it may be determined that the position coordinate (12 mm, 200 mm) corresponds to viewpoint 4.

Further, step S402, as shown in FIG. 4, may be embodied in the following way. First, two position coordinates in which the Y-axis coordinates are the same and the distance between the X-axis coordinates is equal to the distance between both eyes of the user are selected. Then, the average value of the X-axis coordinates of the above two position coordinates is computed and it is taken as the X-axis coordinate of the human face and the above Y-axis coordinate is taken as the Y-axis coordinate of the human face. It is then possible to get the position coordinate of the human face, thereby obtaining the position coordinate of the user. Last, two viewpoints corresponding to the two position coordinates are taken as the viewpoints corresponding to the position coordinate of the user; namely, the viewpoints where the left eye and the right eye of the user are located. As an example, assume that the distance (e.g., pupil distance) between both eyes of the user is 64 mm. First, two position coordinates in which the Y-axis coordinates are the same and the distance between the X-axis coordinates is equal to the distance between both eyes are selected, and as shown in FIG. 3, are (−52 mm, 200 mm), (12 mm, 200 mm), respectively. Then, the average value of the X-axis coordinates of the above two position coordinates is computed, namely, −20 mm, the average value is taken as the X-axis coordinate of the human face, the above Y-axis coordinate 200 mm is taken as the Y-axis coordinate of the human face. It is then possible to get the position coordinate (−20 mm, 200 mm) of the human face, which may be taken as the position coordinate of the user. Last, viewpoint 5 corresponding to the position coordinate (−52 mm, 200 mm) and viewpoint 4 corresponding to the position coordinate (12 mm, 200 mm) are taken as the viewpoints corresponding to the position coordinate (−20 mm, 200 mm) of the user, namely, the viewpoints where the left eye and the right eye of the user are located are viewpoint 5 and viewpoint 4, respectively.

In this way, the corresponding relationship between multiple position coordinates of a user and viewpoints may be determined, and thereby a database with respect to the corresponding relationship between the positions of the user and the viewpoints where the left eye and the right eye of the user are located may be created therefrom. For example, the database may be expressed in the form of a table shown as follows:

| Y (mm) | X (mm) | | | | | | | |
|---|---|---|---|---|---|---|---|---|
| | ... | −20 | −15 | −10 | 0 | 10 | 15 | 20 | ... |
| ... | | | | | | | | |
| 180 | | 1,5 | 2,1 | 3,2 | 4,3 | 5,4 | 1,5 | 2,1 |
| 190 | | 1,5 | 2,1 | 3,2 | 4,3 | 5,4 | 1,5 | 2,1 |
| 200 | | 5,4 | 1,5 | 2,1 | 3,2 | 4,3 | 5,4 | 1,5 |
| 210 | | 5,4 | 1,5 | 2,1 | 3,2 | 4,3 | 5,4 | 1,5 |
| 220 | | 1,5 | 2,1 | 3,2 | 4,3 | 5,4 | 1,5 | 2,1 |
| 230 | | 1,5 | 2,1 | 3,2 | 4,3 | 5,4 | 1,5 | 2,1 |
| ... | | | | | | | | |

It can be seen from the above table that in the X-axis direction, viewpoints corresponding to the position where the user is located are arranged repeatedly, and in the Y-axis direction, viewpoints corresponding to the position where the user is located are also arranged repeatedly. Therefore, for simplicity, only the corresponding relationship between part of the positions of the user and viewpoints where the left eye and the right eye of the user are located is given here.

In step S202 of the control method as shown in FIG. 2, only after creating a database as described above, can viewpoints where the left eye and the right eye of the user are located be determined simply and rapidly. This may be done by querying in the database the corresponding relationship between viewpoints and position coordinates according to the detected position of the user. A complex computation is not needed and thereby the efficiency is higher.

Figure 5:
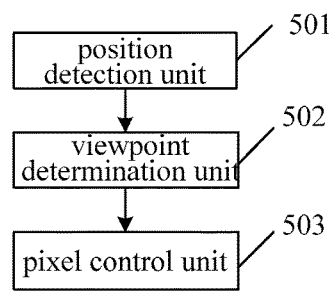
FIG. 5 is a structural block diagram of a control apparatus for a naked eye 3D display apparatus according to an embodiment of the disclosure.

FIG. 5 shows a structural block diagram of a control apparatus for a naked eye 3D display apparatus according to an embodiment of the disclosure. As shown in FIG. 5, the control apparatus comprises: a position detection unit 501 for detecting the position of a user; a viewpoint determination unit 502 for determining viewpoints where the left eye and right eye of the user are located according to the position of the user detected by the position detection unit 501; and a pixel control unit 503 for turning on sub-pixels corresponding to the determined viewpoints and turning off other sub-pixels.

In some embodiments, the position detection unit 501 may comprise a human face recognition module. For example, the position detection unit 501 may include a camera with the function of human face recognition, and thereby detect the position coordinate of the user by the human face recognition module. Further, the control apparatus may further comprise a database creation unit for creating a database, and the database comprises a corresponding relationship between the positions of a user and viewpoints where the left eye and the right eye of the user are located.

In addition, the disclosure further provides a naked eye 3D display apparatus which comprises the control apparatus for a naked eye 3D display apparatus as described in the above embodiment. The naked eye 3D display apparatus may be any product or component such as a liquid crystal panel, a tablet computer, a television set, a display, a notebook, etc. which has the naked eye 3D display function.

Figure 6:
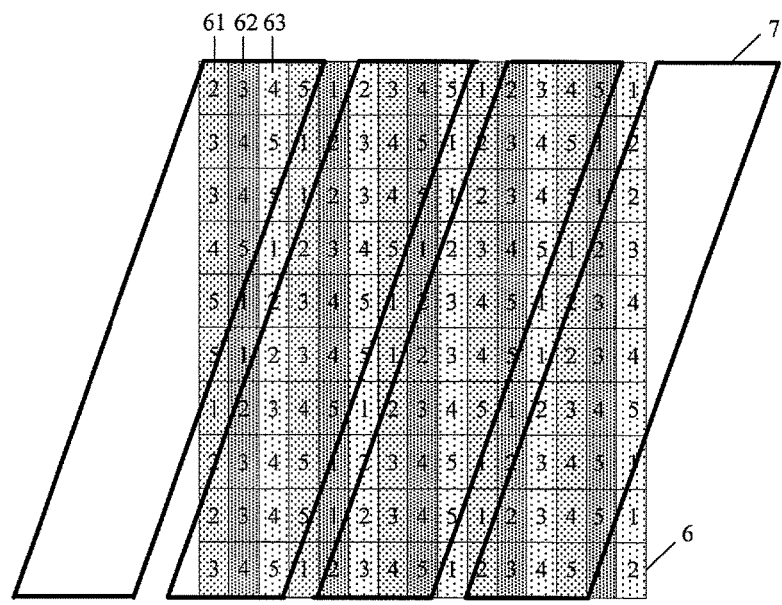
FIG. 6 is a partial schematic diagram of a naked eye 3D display apparatus according to an embodiment of the disclosure.

FIG. 6 shows a partial schematic diagram of a naked eye 3D display apparatus according to an embodiment of the disclosure. As shown in FIG. 6, the naked eye 3D display apparatus comprises a display panel 6 and a grating 7, wherein the display panel 6 comprises red sub-pixels 61, green sub-pixels 62 and blue sub-pixels 63, and the grating 7 comprises light transmission stripes, and wherein the extension direction of the light transmission stripes is parallel to the arrangement direction of sub-pixels corresponding to a single viewpoint (e.g. viewpoint 1), and along the extension direction of the light transmission stripes, the sub-pixels corresponding to a single viewpoint comprise red sub-pixels 61, green sub-pixels 62 and blue sub-pixels 63. Since the extension direction of the light transmission stripes of the grating 7 is parallel to the arrangement direction of sub-pixels corresponding to viewpoint 1, and there are comprised red sub-pixels 61, green sub-pixels 62 and blue sub-pixels 63 along the extension direction of the light transmission stripes, such that the color mixture of viewpoint 1 is uniform in the extension direction of the light transmission stripes, stripes will not occur in a display picture. Additionally, the position of the grating 7 of the naked eye 3D display apparatus may be disposed in front of the display panel 6 as shown in FIG. 6, but it may also be disposed at other position of the naked eye 3D display apparatus, for example, disposed between the display panel 6 and a backlight module of the naked eye 3D display apparatus, which will not be defined particularly here by the disclosure.

The above specification includes specific embodiments of the disclosure, however, the protection scope of the disclosure is not limited thereto, and variations or alternatives easily occurring to any artisan familiar with the technical field within the technical scope disclosed by the disclosure should be encompassed within the protection scope of the disclosure. Therefore, the protection scope of the disclosure should be subject to the protection scope of the claims.

The invention claimed is:

1. A control method for a naked eye 3D display apparatus, comprising:
   obtaining multiple position coordinates within the visual area of the naked eye 3D display apparatus, such that a maximum distance between any two neighboring position coordinates of the multiple position coordinates within the visual area is not more than the width of user's eye;
   determining a viewpoint corresponding to each of the multiple position coordinates according to display pictures viewed at the multiple position coordinates;
   creating a database for a corresponding relationship between user's position and viewpoints where user's left eye and the right eye are located according to the multiple position coordinates and the viewpoints corresponding to the multiple position coordinates;
   detecting a position of a user;
   determining, by querying the database, viewpoints where the left eye and right eye of the user are located according to the detected position of the user; and
   turning on sub-pixels, corresponding to the determined viewpoints at which the left eye and right eye of the user are located, in a display panel of the naked eye 3D display apparatus and turning off other sub-pixels in the display panel.

2. The control method of claim 1, wherein the step of detecting the position of a user comprises:
   detecting the position coordinate of the user by a human face recognition technique.

3. A control apparatus for a naked eye 3D display apparatus, comprising:
   a database creation unit for obtaining multiple position coordinates within the visual area of the naked eye 3D display apparatus, such that a maximum distance between any two neighboring position coordinates of the multiple position coordinates within the visual area is not more than the width of user's eye; determining a viewpoint corresponding to each of the multiple position coordinates according to display pictures viewed at the multiple position coordinates, and creating a database for a corresponding relationship between user's position and viewpoints where user's left eye and the right eye are located according to the multiple position coordinates and the viewpoints corresponding to the multiple position coordinates;
   a human face recognition camera for detecting the position of a user;
   a viewpoint determination unit for determining, by querying the database, viewpoints where the left eye and right eye of the user are located according to the position of the user detected by the position detection unit; and
   a timing controller for turning on sub-pixels corresponding to the determined viewpoints at which the left eye and right eye of the user are located, in a display panel of the naked eye 3D display apparatus and turning off other sub-pixels in the display panel.

4. A naked eye 3D display apparatus, characterized in that, the naked eye 3D display apparatus comprises the control apparatus for a naked eye 3D display apparatus as claimed in claim 3.

5. The naked eye 3D display apparatus as claimed in claim 4, characterized in that, the naked eye 3D display apparatus comprises a display panel and a grating, wherein the display panel comprises red sub-pixels, green sub-pixels and blue sub-pixels, and the grating comprises light transmission stripes, and wherein the extension direction of the light transmission stripes is parallel to the arrangement direction of sub-pixels corresponding to a single viewpoint, and along the extension direction of the light transmission stripes, the sub-pixels corresponding to a single viewpoint comprise red sub-pixels, green sub-pixels and blue sub-pixels.

\* \* \* \* \*